W. R. Wing,

Clasp.

No. 102,640.    Patented May 3, 1870.

Witnesses:
S. S. Mabie
Alex. F. Roberts

Inventor:
W. R. Wing
Per Munn & Co
Attorneys.

United States Patent Office.

WILLIAM R. WING, OF NEWARK, OHIO.

Letters Patent No. 102,640, dated May 3, 1870.

---

IMPROVED STRAP-FASTENER.

---

The Schedule referred to in these Letters Patent and making part of the same.

---

*To all whom it may concern:*

Be it known that I, WILLIAM R. WING, of Newark, in the county of Licking and State of Ohio, have invented a new and Improved Crupper-Fastener; and I do hereby declare that the following is a full, clear, and exact description thereof, which will enable others skilled in the art to make and use the same, reference being had to the accompanying drawings forming part of this specification.

This invention relates to a new and improved fastening for crupper-straps, to be used in substitution of the buckles and straps now used.

It consists in a pair of cylindrical metal fastenings, with one flattened side, one for each end of the strap to be connected, and a correspondingly-shaped ring, fitted to slide on the said fastenings, one of which has a T-headed projection at the end, and the other is fitted to receive and hold it when turned a quarter of a revolution after entering, which brings the flattened sides in line, so that the slide may be adjusted to confine them in this position, all as hereinafter more fully specified.

Similar letters of reference indicate corresponding parts.

A is the fastening, with the T-headed projection.

B, the one with the hole for the reception of the same.

They have sockets for attachment to the ends of the parts of the strap to be connected, and are attached thereto.

C is the sliding ring.

These fastenings A B are cylindrical with parts D, flattened a short distance from the meeting ends, and the ring is correspondingly flattened.

The said flattened parts are so arranged as to coincide when the T-head E has been inserted in the part B, and turned to hook the shoulders behind the shoulders provided in the hole of the part B to hold them.

Figure 1:
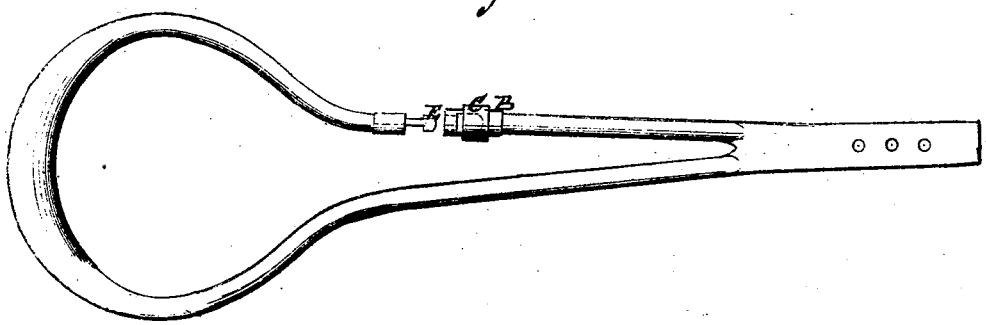
Figure 1 is a plan view of a crupper, arranged according to my improvement for fastenings, but disconnected.
Figure 2:
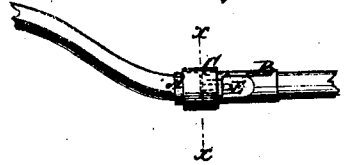
Figure 2 shows the same connected.
Figure 3:
Figure 3 is a transverse section on the line *x x* of fig. 1.

The ring C is then moved over the joint, as shown in fig. 1, where it is caused to remain by the friction due to fitting tightly or other means, and in this position locks the parts together.

For unlocking, the ring is shoved back, and the two parts turned to disengage the shoulders of the one with those of the other.

This mode of fastening is equally applicable for the connection of other straps, cords, small round belts, and the like.

The parts A B and the ring may be square or triangular, and work in the same way, but I prefer to make them as herein described.

Having thus described my invention,

I claim as new and desire to secure by Letters Patent—

Crupper or other strap-fastenings, consisting of the metallic parts A B, fitted for connection by a T-headed projection, and adapted for locking by a ring, as described, and the sliding locking-ring, all combined and arranged substantially as specified.

WM. R. WING.

Witnesses:
S. G. ATHERTON,
CHAS. D. MYER.